July 21, 1925.

E. F. KELLEY

BRAKE MECHANISM

Filed March 21, 1924

1,546,492

Inventor

Edward F. Kelley

By Wooster & Davis

Attorneys.

Patented July 21, 1925.

1,546,492

UNITED STATES PATENT OFFICE.

EDWARD F. KELLEY, OF BRIDGEPORT, CONNECTICUT, ASSIGNOR TO THE RAYBESTOS COMPANY, OF BRIDGEPORT, CONNECTICUT, A CORPORATION OF CONNECTICUT.

BRAKE MECHANISM.

Application filed March 21, 1924. Serial No. 700,830.

*To all whom it may concern:*

Be it known that I, EDWARD F. KELLEY, a citizen of the United States, residing at Bridgeport, county of Fairfield, State of Connecticut, have invented a new and useful Brake Mechanism, of which the following is a specification.

This invention relates to brake mechanism, such as may be used for motor vehicles, propeller shafts, or other similar rotating elements, and has for an object to provide a brake mechanism of this character in which the operating lever may assume various angular positions to a plane at right angles to the axis of the rotating element. In other words, it provides a mechanism in which the pull on the lever is not necessarily at right angles to the axis of rotation of the rotating element, but may be in directions at different angles thereto or parallel therewith, as desired.

With this and other objects in view, I have devised the construction illustrated in the accompanying drawing, forming a part of this specification, the showing therein indicating one embodiment of my invention, it being apparent that the principles of the invention may be embodied in other specific constructions without departing from the spirit of my invention. In this drawing, Fig. 1 is a side elevation of a brake mechanism embodying my invention, the illustration showing it applied to an external brake band for a rotating drum.

Figure 1:
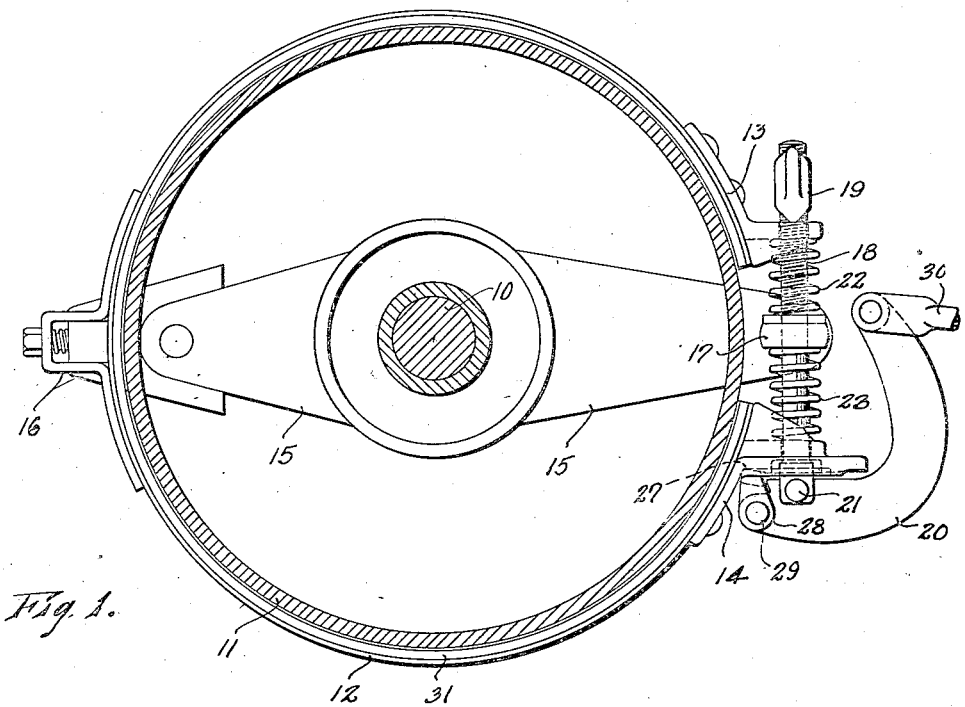

In Fig. 1 is shown a shaft 10 carrying a rotating drum 11. Embracing the drum is a brake band 12 having separated free ends 13 and 14 at one side of the drum, the ends of the band being projected outwardly at substantially right angles to the body thereof to provide substantially parallel portions for connection to the operating mechanism. These portions may be integral with the band or may comprise angular brackets riveted thereto, which to all intents and purposes are portions of the band. Means are provided for preventing the band turning with the drum, and this may comprise any of the usual constructions. In the present case an arm 15 embraces the shaft and has a connection to the band intermediate its free ends as indicated at 16, and at its other end it is provided with a bearing 17 between the free ends of the band to provide a guide for a rod 18. In the present construction this rod extends through the free ends 13 and 14 of the band and is adjustably connected with one of them, in the present instance the upper end 13, by means of a nut 19 having threaded engagement with the rod. By adjusting this nut the effective length of the rod may be varied. An operating lever 20 is pivoted to the rod outside the other free end, as shown at 21, and springs 22 and 23 embrace the rod and engage the bearing 17 and the respective free ends 13 and 14. These springs are compression springs, and therefore, tend to keep the free ends of the band separated and the band out of contact with the drum.

Figures 4, 5:
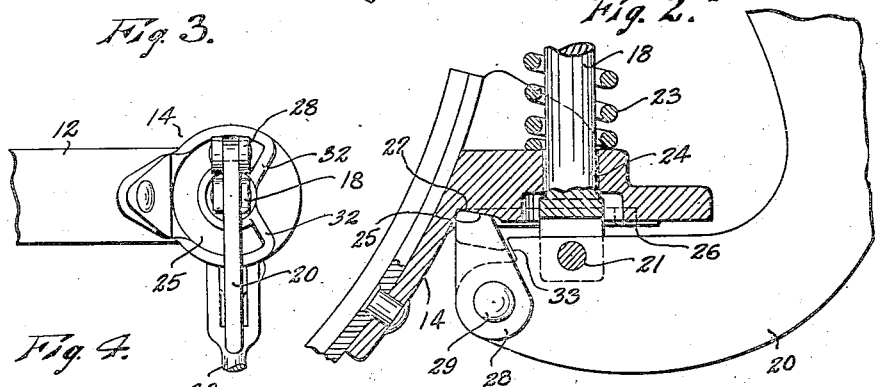
Fig. 4 is a similar view showing the operating lever at substantially right angles to the plane of the drum or substantially parallel with the axis of rotation of the drum.
Fig. 5 is a partial side elevation and a partial section substantially on line 5—5 of Fig. 2 and on an enlarged scale.
Figure 6:
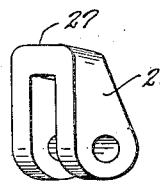
Fig. 6 is a perspective view of the toggle block.

In the present instance the lower free end of the band is provided with an opening 24 through which the rod passes and in which it may slide, and about this opening is a circular groove 25 the bottom of which is preferably inclined away from the opening, as shown in Fig. 5, with a rib 26 at the outer edge thereof forming an abutment for the free end 27 of a toggle block 28 when the end of this block rests in the groove. This toggle block is preferably substantially U-shaped, as shown in Fig. 6, and the lever is pivoted between the legs thereof by any suitable means as a pin 29. At the free end of the lever is connected the usual pull rod 30.

Figures 2, 3:
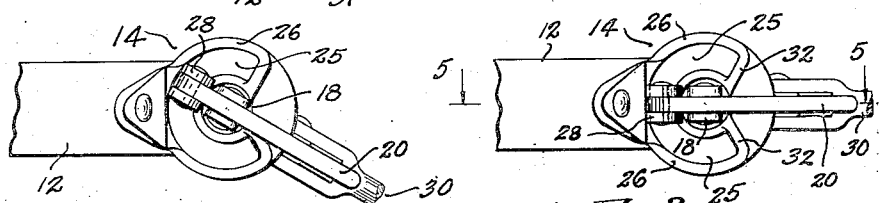
Fig. 2 is a bottom plan view of the operating lever and its connection to the band as shown in Fig. 1.
Fig. 3 is a similar view showing the lever located at an angle to the plane of the drum.

In operation tension on the pull rod will swing the lever on its pivot 29 and will tend to draw the upper end of the brake band downwardly, as viewed in Fig. 1, and pressure of the toggle block on the lower end 14 will move this end upwardly. In other words, pull on the pull rod will draw the free ends of the band together and clamp it about the drum. The band is lined with the usual brake lining 31, such as an asbestos lining or any other suitable lining. It will be apparent that the free end 27 of the toggle block rests in the groove 25 and has sliding engagement therewith, and as the rod 18 may turn relative to the band it will be apparent that the lever 20 may be positioned at any desired angle to the plane of the drum. As shown in Figs. 1, 2 and 5, the lever is substantially in the plane of the drum or in a plane at right angles to the axis of rotation of the drum and the pull, as is the usual construction, is substantially in this plane or at right angles to the axis of rotation of the drum. Under certain conditions, however, it is inconvenient to have the pull away from the axis at right angles thereto, and under these conditions all that is necessary is to swing the lever about the axis of the rod 18 to the desired position so that the pull rod may be positioned to extend at substantially any angle to the plane of rotation of the drum. The mechanism will operate in the same way in all positions. In Fig. 3 is shown the position of the elements where the direction of pull on the pull rod is less than ninety degrees to the plane of the drum. In some uses, as for instance where the brake is employed for a propeller shaft, it is desirable to have the pull rod extend substantially parallel with the shaft. The lever may be brought into this position by merely turning it about the axis of the rod 18, the free end 27 of the toggle block sliding in the groove 25. This position is indicated in Fig. 4.

In order to limit the turning movement, ribs 32 may be provided at the end of the groove to be engaged by the toggle block to form a limit stop therefor. The bottom of the groove 25 is preferably inclined outwardly, as shown in Fig. 5, to prevent the free end 27 of the toggle block moving inwardly out of position. As under normal operation the spring 23 presses the end of the block against the bottom of this groove it will be held against the abutment 26. If desired, however, the lever 20 may be provided with a shoulder 33 to engage the end of the toggle block and prevent it moving inwardly.

It will be apparent the device is very simple in construction involving a minimum number of parts, but that the operating lever may assume practically any angular position with respect to the plane of the drum, and that the mechanism may thus be used with the pull rod extending in practically any direction desired.

Having thus set forth the nature of my invention, what I claim is:

1. In a braking mechanism, a rotary drum, a brake band embracing the drum having free ends on one side thereof, a lever having pivotal connection with one end of said band, and an operating means connected to the lever and the other end of the band, said lever being arranged for turning movement relative to said band in a plurality of different planes.

2. In a braking mechanism, a rotary drum, a brake band embracing said drum having free ends at one side thereof, a rod connected to one of said free ends, a lever connected to said rod, and a pivotal connection from the lever to the other free end and adapted for movement about the axis of said rod.

3. In a braking mechanism, a rotary drum, a brake band embracing said drum having free ends at one side thereof, a rod connected to one of said free ends, a lever connected to said rod, and a toggle block connected to the lever and engaging the other free end, said block being adapted for movement about the axis of the rod to allow positioning of the lever at various angles to the plane of the drum.

4. In a braking mechanism, a rotary drum, a brake element having portions movable toward and from said drum, means for moving said portions including a rod connected to one of them, a lever connected to said rod, and a toggle block secured to the lever and engaging the other portion, said block being adapted for movement about the axis of the rod to allow positioning of the lever at various angles to the plane of the drum.

5. In a braking mechanism, a rotary drum, a brake band embracing said drum having free ends at one side thereof, a rod connected to one of said free ends, a lever pivoted to said rod, and a toggle block pivoted to the lever and having sliding engagement with the other free end.

6. In a braking mechanism, a rotary drum, a brake band embracing said drum having free ends at one side thereof, a rod connected to one of said free ends, a lever pivoted to said rod, and a toggle block pivoted to said lever, the other free end being provided with a circular groove, and said toggle block being provided with a free end in said groove and having sliding engagement therewith.

7. In a braking mechanism, a rotary drum, a brake band embracing said drum having free ends at one side thereof, a rod connected to one of said free ends, a stationary guide for the rod between said ends, springs embracing the rod and tending to hold the ends separated, a lever pivoted to the rod, and a toggle block pivoted to the lever and having rocking engagement with the other free end, said block also having sliding engagement therewith to allow positioning of the lever at various angular positions to the plane of the drum.

8. In a braking mechanism, a rotary drum, a brake band embracing said drum having free ends at one side thereof, a rod connected to one of said free ends, a stationary guide for the rod between said ends, springs embracing the rod and tending to hold the ends separated, a lever secured to the rod, and means for operatively connecting the lever to the other free end arranged to allow positioning of the lever at various angular positions to the plane of the drum.

9. In a braking mechanism, a rotary drum, a brake band embracing said drum having free ends at one side thereof, a rod connected to one of said free ends, a stationary guide for the rod between said ends, springs embracing the rod and tending to hold the ends separated, said rod also guided for sliding movement in the other free end, a lever pivoted to said rod, said latter free end of the band being provided with a circular groove substantially concentric with the axis of the rod, and a toggle block provided with a free end in said groove and having sliding engagement therewith to allow the lever to assume various angular positions to the plane of the drum.

10. In a braking mechanism, a rotary drum, a brake element having portions movable toward and from said drum, a rod connected to one of said portions and slidable relative to the other portion, a guide for the rod between said portions, springs embracing the rod on opposite sides of the guide and tending to hold said portions separated, a lever secured to the rod, and a pivotal connection from the lever to the other movable portion of the brake element and arranged for movement about the axis of the rod.

In testimony whereof I affix my signature.

EDWARD F. KELLEY.